(12) United States Patent
Iwai et al.

(10) Patent No.: US 9,297,452 B2
(45) Date of Patent: Mar. 29, 2016

(54) BICYCLE SPROCKET

(71) Applicant: SHIMANO INC., Sakai (JP)

(72) Inventors: Tooru Iwai, Sakai (JP); Toyoshi Yoshida, Sakai (JP)

(73) Assignee: Shimano Inc., Sakai (JP)

( * ) Notice: Subject to any disclaimer, the term of this patent is extended or adjusted under 35 U.S.C. 154(b) by 319 days.

(21) Appl. No.: 14/043,770

(22) Filed: Oct. 1, 2013

(65) Prior Publication Data
US 2015/0094179 A1 Apr. 2, 2015

(51) Int. Cl.
*F16H 55/30* (2006.01)
*B62M 9/00* (2006.01)

(52) U.S. Cl.
CPC ............... *F16H 55/30* (2013.01); *B62M 9/00* (2013.01); *F16H 2055/306* (2013.01)

(58) Field of Classification Search
CPC . F16H 55/30; F16H 55/171; F16H 2055/306; B62M 9/00
USPC .......................... 474/151, 152, 160, 161, 162
See application file for complete search history.

(56) References Cited

U.S. PATENT DOCUMENTS

| | | | | |
|---|---|---|---|---|
| 4,078,445 A | * | 3/1978 | Kiser, Jr. ............... | F16H 55/30 29/893.3 |
| 4,144,773 A | * | 3/1979 | Addicks ................ | B62M 9/105 403/3 |
| 5,026,329 A | * | 6/1991 | Diekevers .......... | B62D 55/0963 474/162 |
| 5,203,861 A | * | 4/1993 | Irwin ..................... | B65G 23/06 474/161 |
| 5,947,852 A | * | 9/1999 | Moretz ................... | F16H 55/12 474/160 |
| 7,883,437 B2 | * | 2/2011 | Braedt ..................... | B62M 9/10 474/141 |
| 2003/0195072 A1 | * | 10/2003 | Redmond ............... | F16H 55/30 474/161 |
| 2007/0129193 A1 | * | 6/2007 | Nonoshita ................ | B62M 9/10 474/160 |
| 2007/0265122 A1 | * | 11/2007 | Emura .................... | B62M 9/105 474/152 |
| 2008/0132367 A1 | | 6/2008 | Braedt | |
| 2009/0042682 A1 | * | 2/2009 | Dal Pra' ................. | F16H 55/30 474/160 |
| 2015/0210353 A1 | * | 7/2015 | Tokuyama ............... | B62M 9/12 474/160 |

FOREIGN PATENT DOCUMENTS

| DE | 102005007819 | 8/2006 |
|---|---|---|
| DE | 102007049880 | 4/2009 |

* cited by examiner

*Primary Examiner* — William E Dondero
*Assistant Examiner* — Robert T Reese
(74) *Attorney, Agent, or Firm* — Mori & Ward, LLP

(57) ABSTRACT

A bicycle sprocket comprises a sprocket member. The sprocket member includes an annular base portion, sprocket teeth, and a closed tooth opening. The sprocket teeth are configured to protrude radially outwardly from the annular base portion. The sprocket teeth are arranged in a circumferential direction of the annular base portion. Each of the sprocket teeth has a tooth bottom defining a root circle of the sprocket teeth. The closed tooth opening is at least partly positioned radially outwardly from the root circle.

30 Claims, 17 Drawing Sheets

BICYCLE SPROCKET

BACKGROUND OF THE INVENTION

1. Field of the Invention

The present invention relates to a bicycle sprocket.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket has a rotational center axis and comprises a sprocket member. The sprocket member includes an annular base portion, sprocket teeth, and a closed tooth opening. The sprocket teeth are configured to protrude radially outwardly from the annular base portion. The sprocket teeth are arranged in a circumferential direction of the annular base portion. Each of the sprocket teeth has a tooth bottom defining a root circle of the sprocket teeth. The closed tooth opening is at least partly positioned radially outwardly from the root circle.

In accordance with a second aspect of the present invention, the bicycle sprocket according to the first aspect is configured so that the sprocket member includes a plurality of closed tooth openings. Each of the closed tooth openings is at least partly positioned radially outwardly from the root circle.

In accordance with a third aspect of the present invention, the bicycle sprocket according to the second aspect is configured so that a total number of the closed tooth openings is equal to a total number of the sprocket teeth.

In accordance with a fourth aspect of the present invention, the bicycle sprocket according to the first aspect is configured so that the sprocket member is made of metallic material.

In accordance with a fifth aspect of the present invention, the bicycle sprocket according to the first aspect further comprises a non-metallic member configured to be disposed in the closed tooth opening.

In accordance with a sixth aspect of the present invention, the bicycle sprocket according to the fifth aspect is configured so that the non-metallic member includes resin material.

In accordance with a seventh aspect of the present invention, the bicycle sprocket according to the fifth aspect is configured so that the non-metallic member is made of polytetrafluoroethylene.

In accordance with an eighth aspect of the present invention, the bicycle sprocket according to the fifth aspect is configured so that the non-metallic member includes liquid lubricant.

In accordance with a ninth aspect of the present invention, the bicycle sprocket according to the fifth aspect is configured so that the non-metallic member includes solid lubricant.

In accordance with a tenth aspect of the present invention, the bicycle sprocket according to the first aspect further comprises a base member made of non-metallic material. The annular base portion of the sprocket member is configured to be attached to the base member.

In accordance with an eleventh aspect of the present invention, the bicycle sprocket according to the tenth aspect is configured so that the closed tooth opening is at least partly positioned radially outwardly from a radially outer peripheral edge of the base member.

In accordance with a twelfth aspect of the present invention, the bicycle sprocket according to the tenth aspect is configured so that a crank attachment portion to which a crank arm is to be attached. The crank attachment portion is configured to be attached to the base member.

In accordance with a thirteenth aspect of the present invention, the bicycle sprocket according to the tenth aspect further comprises a cover member configured to be attached to the base member.

In accordance with a fourteenth aspect of the present invention, the bicycle sprocket according to the thirteenth aspect is configured so that the closed tooth opening is at least partly positioned radially outwardly from a radially outer peripheral edge of the cover member.

In accordance with a fifteenth aspect of the present invention, the bicycle sprocket according to the tenth aspect is configured so that the annular base portion includes a first through-hole. At least part of the annular base portion is embedded in the base member such that a part of the base member is provided in the first through-hole.

In accordance with a sixteenth aspect of the present invention, the bicycle sprocket according to the fifteenth aspect is configured so that the first through-hole is provided radially inward of the closed tooth opening In accordance with a seventeenth aspect of the present invention, the bicycle sprocket according to the sixteenth aspect further comprises a pin member attached to the sprocket member. The annular base portion of the sprocket member includes a second through-hole. The pin member is attached to the sprocket member through the second through-hole.

In accordance with an eighteenth aspect of the present invention, the bicycle sprocket according to the sixteenth aspect is configured so that the second through-hole is provided radially inward from the closed tooth opening.

In accordance with a nineteenth aspect of the present invention, the bicycle sprocket according to the first aspect is configured so that the tooth bottom is provided on a radially outer peripheral edge of the annular base portion. The root circle is defined on the radially outer peripheral edge of the annular base portion.

In accordance with a twentieth aspect of the present invention, the bicycle sprocket according to the first aspect is configured so that the closed tooth opening is symmetrical with respect to a tooth centerline radially extending from the rotational center axis of the bicycle sprocket.

In accordance with a twenty-first aspect of the present invention, the bicycle sprocket according to the first aspect is configured so that the closed tooth opening is asymmetrical with respect to a tooth centerline radially extending from the rotational center axis of the bicycle sprocket.

In accordance with a twenty-second aspect of the present invention, a bicycle sprocket bicycle sprocket has a rotational center axis and comprises a sprocket member. The sprocket member includes an annular base portion, sprocket teeth, and a closed tooth opening. The sprocket teeth are configured to protrude radially outwardly from the annular base portion. The sprocket teeth are arranged in a circumferential direction of the annular base portion. The closed tooth opening includes a first curved inner edge. One of the sprocket teeth includes a first outer edge and a second outer edge opposite to the first outer edge with respect to the closed tooth opening in the circumferential direction. The first outer edge has a first curved outer edge. The first curved inner edge is provided to at least partly extend along the first curved outer edge when viewed from an axial direction parallel to the rotational center axis.

In accordance with a twenty-third aspect of the present invention, the bicycle sprocket according to the twenty-second aspect is configured so that a center of curvature of the first curved inner edge is disposed at a same position as a center of curvature of the first curved outer edge when viewed from the axial direction.

In accordance with a twenty-fourth aspect of the present invention, the bicycle sprocket according to the twenty-second aspect is configured so that the second outer edge has a second curved outer edge. The closed tooth opening includes a second curved inner edge. The second curved inner edge is provided to at least partly extend along the second curved outer edge when viewed from the axial direction.

In accordance with a twenty-fifth aspect of the present invention, the bicycle sprocket according to the twenty-fourth aspect is configured so that a center of curvature of the second curved inner edge is disposed at a same position as a center of curvature of the second curved outer edge when viewed from the axial direction.

In accordance with a twenty-sixth aspect of the present invention, the bicycle sprocket according to the twenty-second aspect is configured so that each of the sprocket teeth has a tooth bottom defining a root circle of the sprocket teeth. The closed tooth opening is at least partly positioned radially outwardly from the root circle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
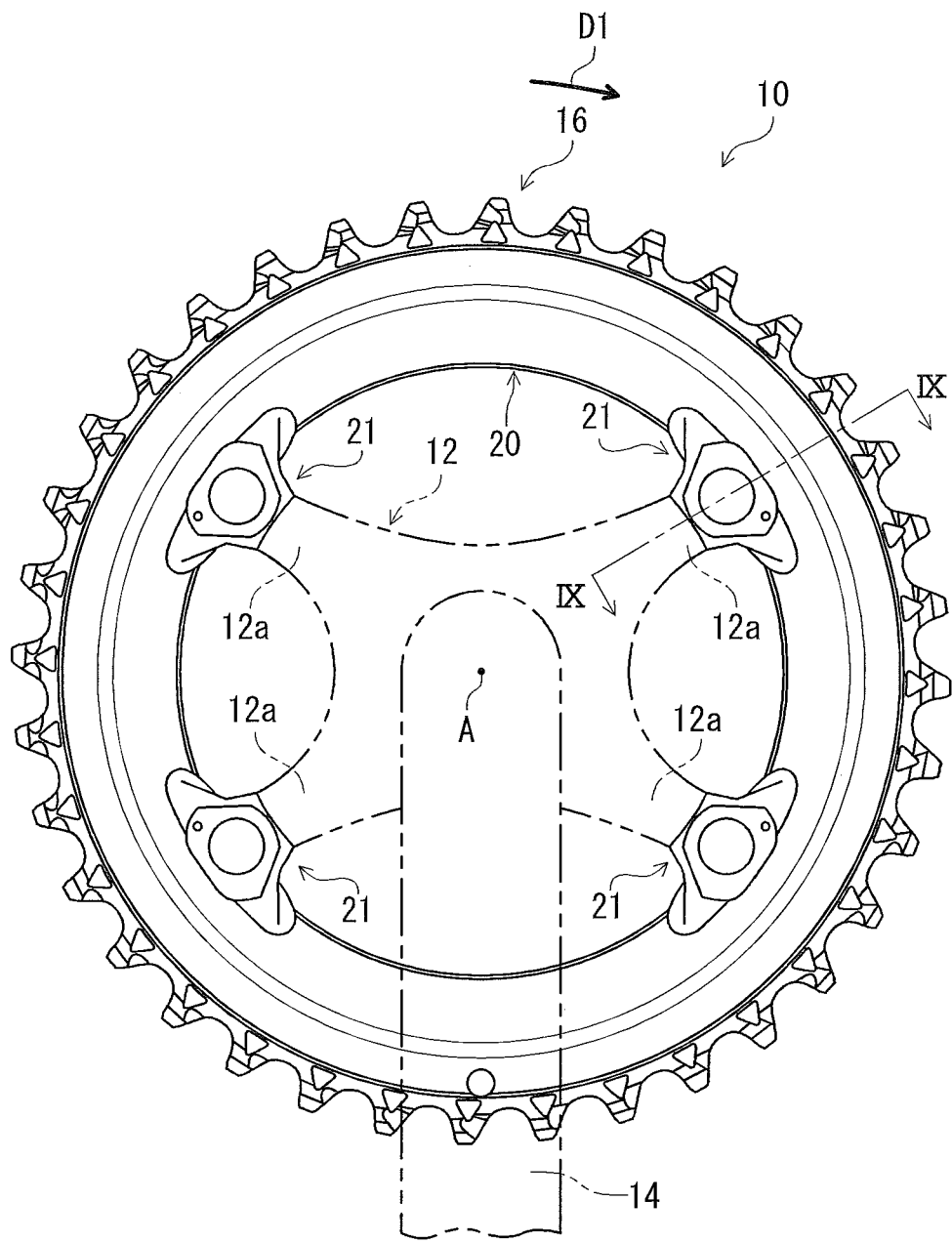
FIG. 1 is an outside elevational view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with the first embodiment is illustrated. The bicycle sprocket 10 is a front sprocket configured to be provided on a gear crank (right crank) of a bicycle. The bicycle sprocket 10 is configured to be rotatable about a rotational center axis A. The bicycle sprocket 10 is configured to be fastened to crank connecting arms 12a of a sprocket mounting member 12 by bolts (not shown). The sprocket mounting member 12 is fastened on a crank arm 14 to be rotatable integrally with the crank arm 14 about the rotational center axis A. Namely, the bicycle sprocket 10 is configured to be rotatable integrally with the sprocket mounting member 12 and the crank arm 14 about the rotational center axis A. The bicycle sprocket 10 is configured to be rotated about the rotational center axis A in a rotational driving direction D1 during the pedaling.

Figure 2:
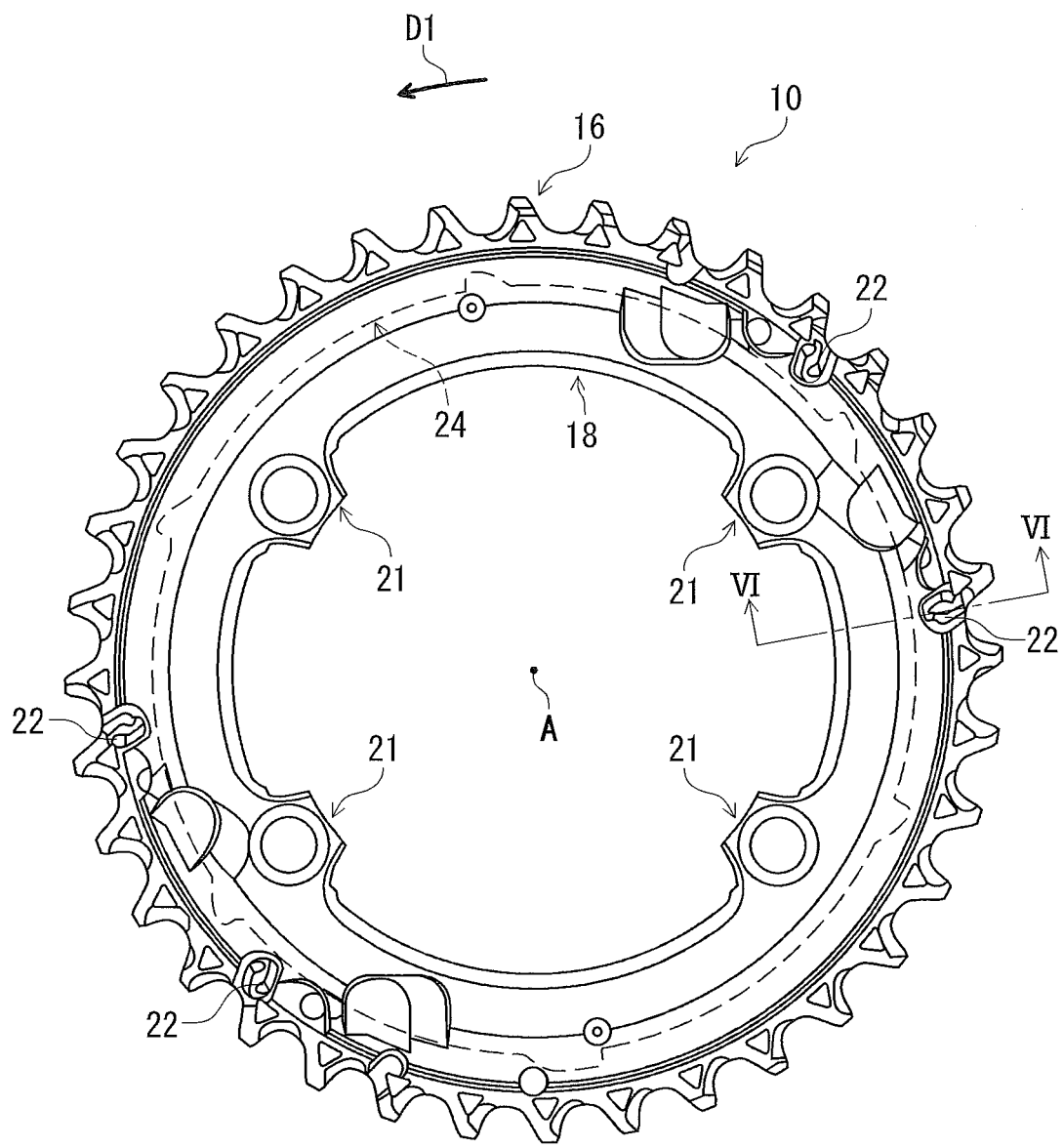
FIG. 2 is an inside elevational view of the bicycle sprocket illustrated in FIG. 1.

As illustrated in FIGS. 1 and 2, the bicycle sprocket 10 has the rotational center axis A, and comprises a sprocket member 16. Preferably, the bicycle sprocket further comprises a base member 18, a cover member 20, crank attachment portions 21, and pin members 22. The sprocket member 16 is configured to engage with a bicycle chain and is configured to be attached to the base member 18. The cover member 20 is configured to be attached to the base member 18. The cover member 20 is attached to the base member 18 by adhesive, for example. The crank attachment portions 21 are configured to be attached to the base member 18. The sprocket mounting member 12 is fastened to the crank attachment portions 21. The pin members 22 are spike pins configured to guide the bicycle chain onto the sprocket member 16 and are attached to the sprocket member 16.

The sprocket member 16 is made of a hard and/or rigid material such as metallic material. The crank attachment portions 21 are made of a hard and/or rigid material such as metallic material. The base member 18 is made of non-metallic material such as non-metallic material including resin material. In the illustrated embodiment, the base member 18, the sprocket member 16, and the crank attachment portions 21 are integrally formed by the insert molding. The cover member 20 is made of a hard and/or rigid material such as metallic material. Namely, the bicycle sprocket 10 is a composite gear (a composite sprocket). However, it will be apparent to those skilled in the bicycle field from the present disclosure that the bicycle sprocket 10 can be made of a single hard and/or rigid material such as metallic material. Furthermore, it will be apparent to those skilled in the bicycle field from the present disclosure that at least one of the base member 18 and the cover member 20 can be omitted if needed and/or desired.

Figure 3:
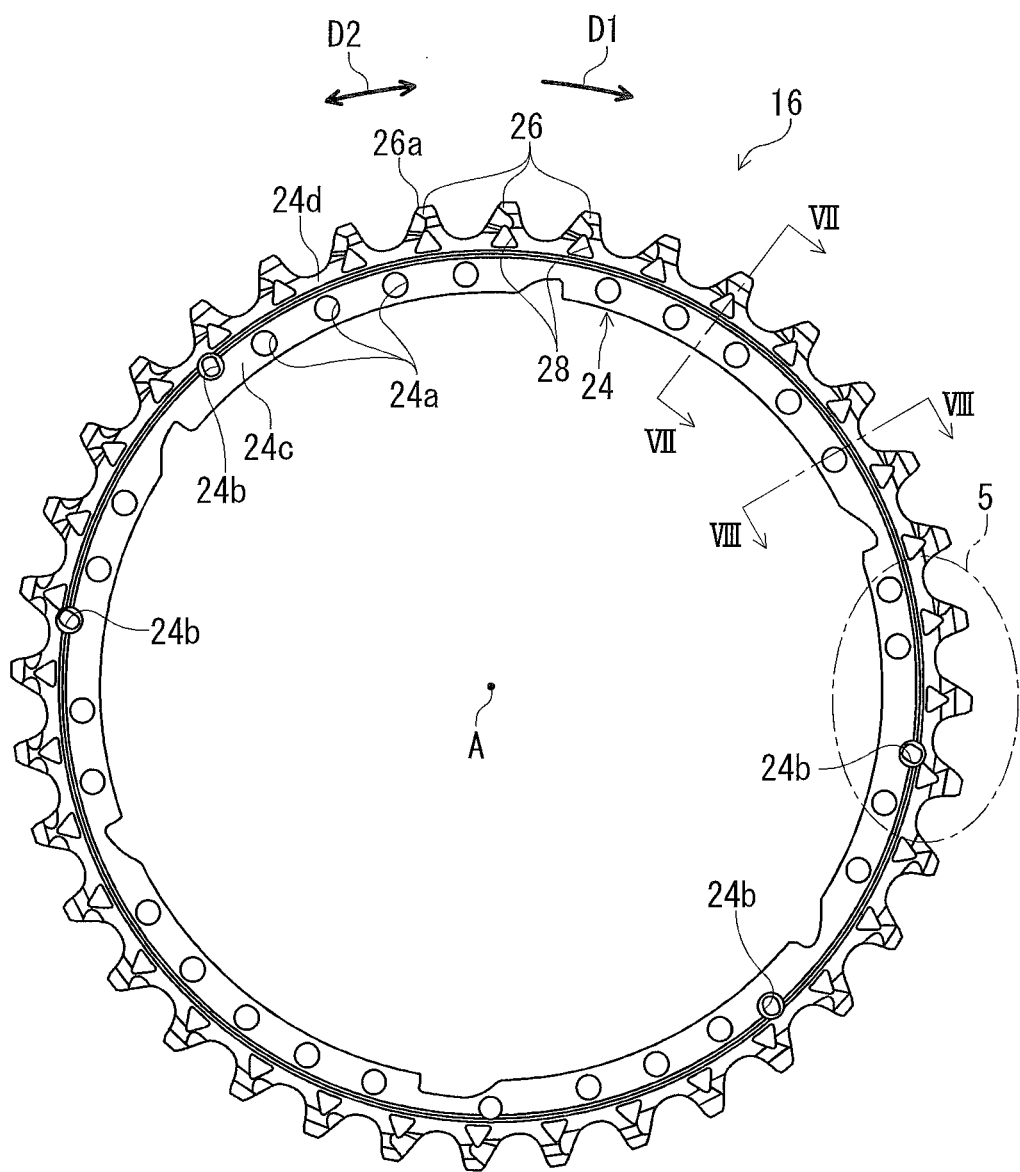
FIG. 3 is an outside elevational view of a sprocket member of the bicycle sprocket illustrated in FIG. 1.
Figure 4:
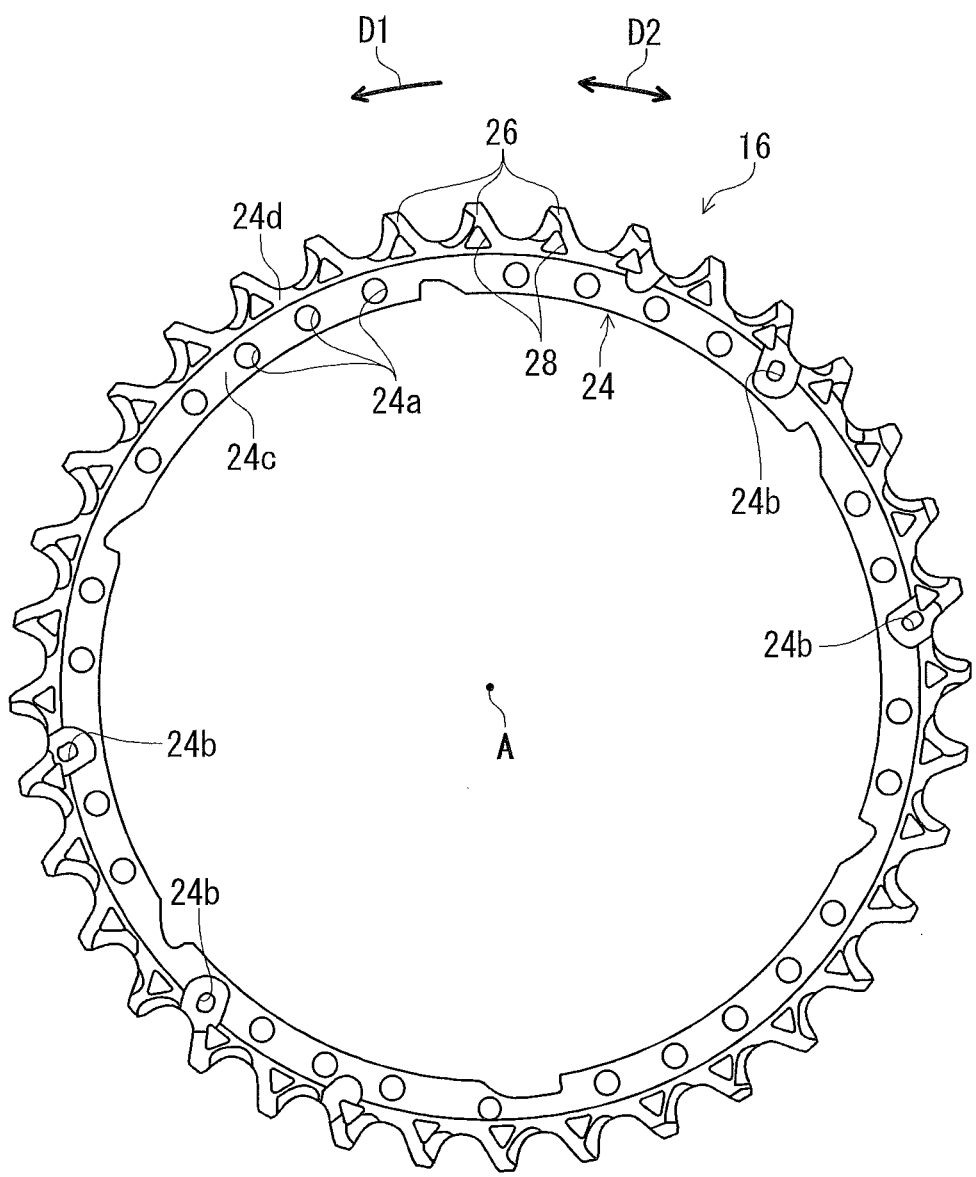
FIG. 4 is an inside elevational view of the sprocket member illustrated in FIG. 3.

Referring to FIGS. 3 and 4, the sprocket member 16 includes an annular base portion 24, sprocket teeth 26, and a plurality of closed tooth openings 28. The annular base portion 24 is configured to be attached to the base member 18 (FIG. 2). The sprocket teeth 26 are configured to protrude radially outwardly from the annular base portion 24. The sprocket teeth 26 are arranged in a circumferential direction D2 of the annular base portion 24. The sprocket teeth 26 are spaced apart from each other in the circumferential direction D2. The circumferential direction D2 can be defined as a circumferential direction of the bicycle sprocket 10, the base member 18, and the cover member 20. In the illustrated embodiment, the closed tooth openings 28 have the same shape as each other. However, it will be apparent to those skilled in the bicycle field from the present disclosure that the closed tooth openings 28 can have different shapes from each other.

As illustrated in FIGS. 3 and 4, the closed tooth openings 28 are provided at positions corresponding to the sprocket teeth 26, respectively. A total number of the closed tooth openings 28 is equal to a total number of the sprocket teeth 26. However, it will be apparent to those skilled in the bicycle field from the present disclosure that the total number of the closed tooth openings 28 can be different from the total number of the sprocket teeth 26. The total number of the closed tooth openings 28 can be greater than the total number of the sprocket teeth 26. The total number of the closed tooth openings 28 can be smaller than the total number of the sprocket teeth 26. It will be apparent to those skilled in the bicycle field from the present disclosure that the sprocket member 16 can include at least one closed tooth opening.

As illustrated in FIGS. 3 and 4, the annular base portion 24 of the sprocket member 16 includes first through-holes 24a and second through-holes 24b. The first through-holes 24a are arranged in the circumferential direction D2. In the illustrated embodiment, the first through-holes 24a are provided radially inward of the closed tooth openings 28. Each of the first through-holes 24a is preferably provided at a circumferential middle position between adjacent two closed tooth openings 28 among the closed tooth openings 28. It will be apparent to those skilled in the bicycle field from the present disclosure that the annular base portion 24 can include at least one first through-hole 24a. Furthermore, it will be apparent to those skilled in the bicycle field from the present disclosure that the first through-holes 24a can be omitted if needed and/or desired.

As illustrated in FIGS. 3 and 4, the second through-holes 24b are spaced apart from each other in the circumferential direction D2. In the illustrated embodiment, the second through-holes 24b are provided radially inward from the closed tooth openings 28. The second through-holes 24b are provided radially outward from the first through-holes 24a. Unlike the first through-holes 24a, each of the second through-holes 24b is closer to one of adjacent two closed tooth openings 28 of the closed tooth openings 28 than another of the adjacent two closed tooth openings 28 in the circumferential direction D2. It will be apparent to those skilled in the bicycle field from the present disclosure that the annular base portion 24 can include at least one second through-hole 24b. Furthermore, it will be apparent to those skilled in the bicycle field from the present disclosure that the second through-holes 24b can be omitted if needed and/or desired.

Figure 5:
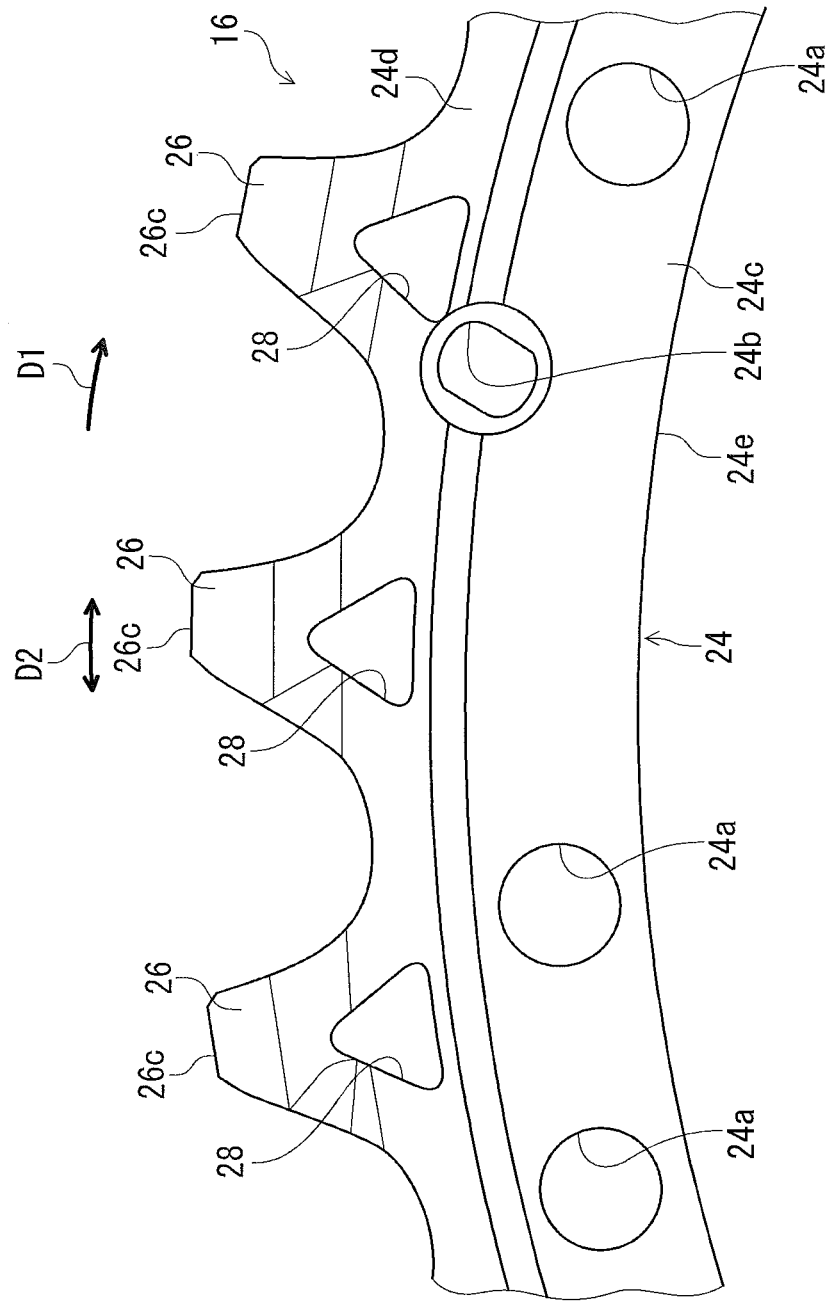
FIG. 5 is an enlarged outside elevational view of a portion of the sprocket member illustrated in FIG. 3.

As illustrated in FIG. 5, each of the closed tooth openings 28 is closer to a radially outermost edge 26c of each of the sprocket teeth 26 than to a radially inner peripheral edge 24e of the annular base portion 24. On the other hand, each of the first through-holes 24a is closer to the radially inner peripheral edge 24e of the annular base portion 24 than to the radially outermost edge 26c of each of the sprocket teeth 26. Similarly, each of the second through-holes 24b is closer to the radially inner peripheral edge 24e of the annular base portion 24 than to the radially outermost edge 26c of each of the sprocket teeth 26.

Figure 6:
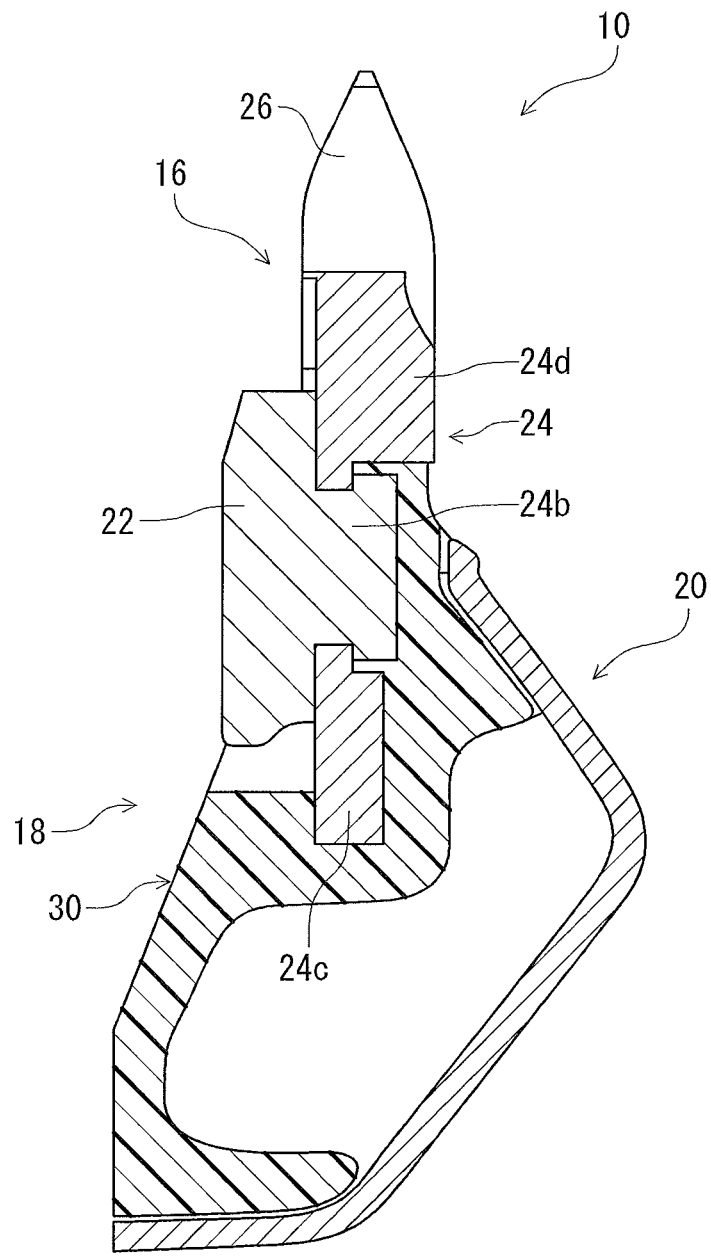
FIG. 6 is a cross-sectional view of the bicycle sprocket taken along line VI-VI of FIG. 2.

As illustrated in FIG. 6, the pin members 22 are attached to the sprocket member 16 through the second through-holes 24b, respectively. In the illustrated embodiment, the pin members 22 are attached to the sprocket member 16 before the insert molding of the sprocket member 16. A part of each of the pin members 22 are embedded in the base member 18 as well as the sprocket member 16.

Figure 8:
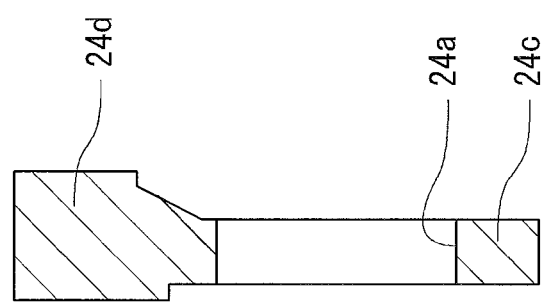
FIG. 8 is a cross-sectional view of the sprocket member taken along line VIII-VIII of FIG. 3.
Figure 7:
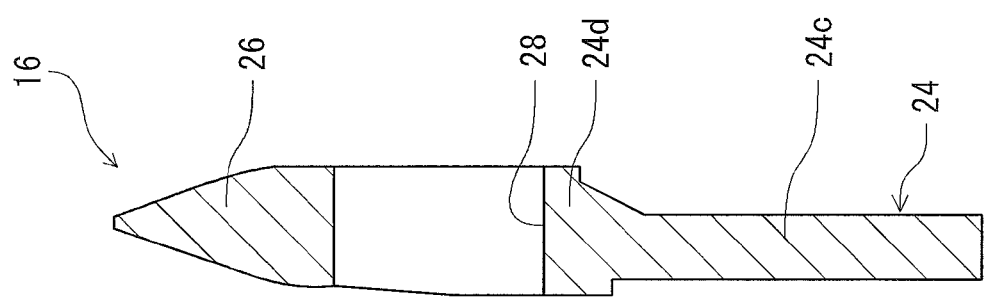
FIG. 7 is a cross-sectional view of the sprocket member taken along line VII-VII of FIG. 3.

As illustrated in FIGS. 6 to 8, the annular base portion 24 includes a first annular section 24c and a second annular section 24d. The first annular section 24c has a thickness smaller than a thickness of the second annular section 24d. The second annular section 24d is provided radially outward of the first annular section 24c. As illustrated in FIG. 7, the closed tooth openings 28 are provided in the second annular section 24d. As illustrated in FIG. 8, the first through-holes 24a are provided in the first annular section 24c.

Figure 9:
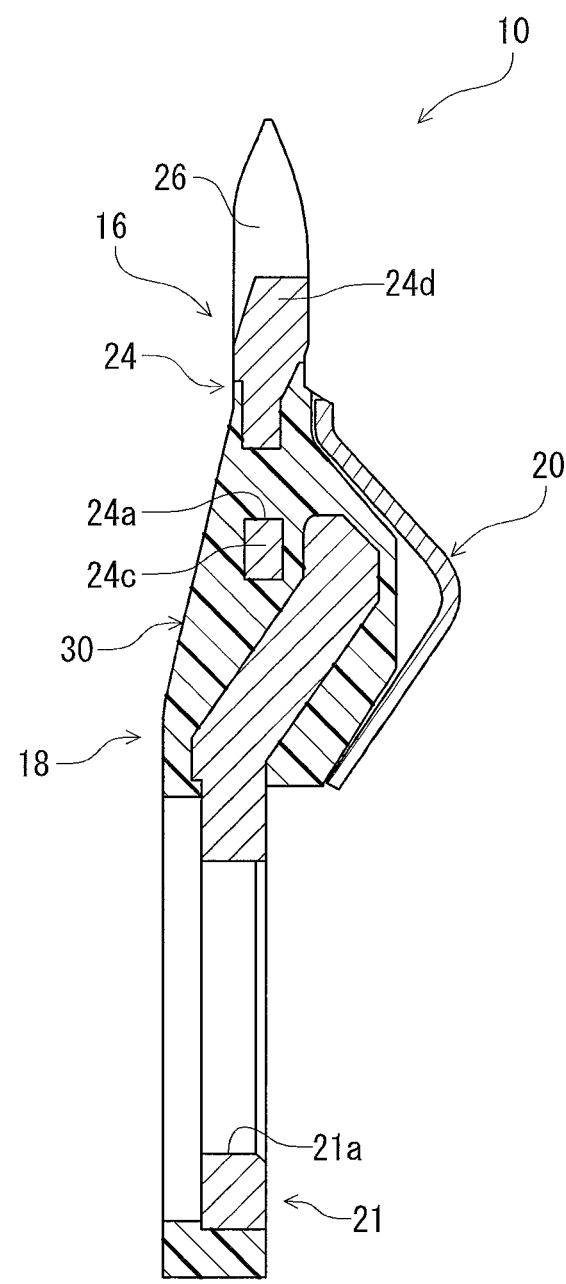
FIG. 9 is a cross-sectional view of the bicycle sprocket taken along line IX-IX of FIG. 1.

Referring to FIG. 9, a part of the annular base portion 24 is embedded in the base member 18 such that a part of the base member 18 is provided in the first through-holes 24a. In the illustrated embodiment, the first annular section 24c and a part of the second annular section 24d are embedded in the base member 18. However, it will be apparent to those skilled in the bicycle field from the present disclosure that the entirety of the annular base portion 24 can be embedded in the base member 18. Since the part of the base member 18 is provided in the first through-holes 24a by the insert molding, the sprocket member 16 can be firmly coupled to the base member 18.

Figure 10:
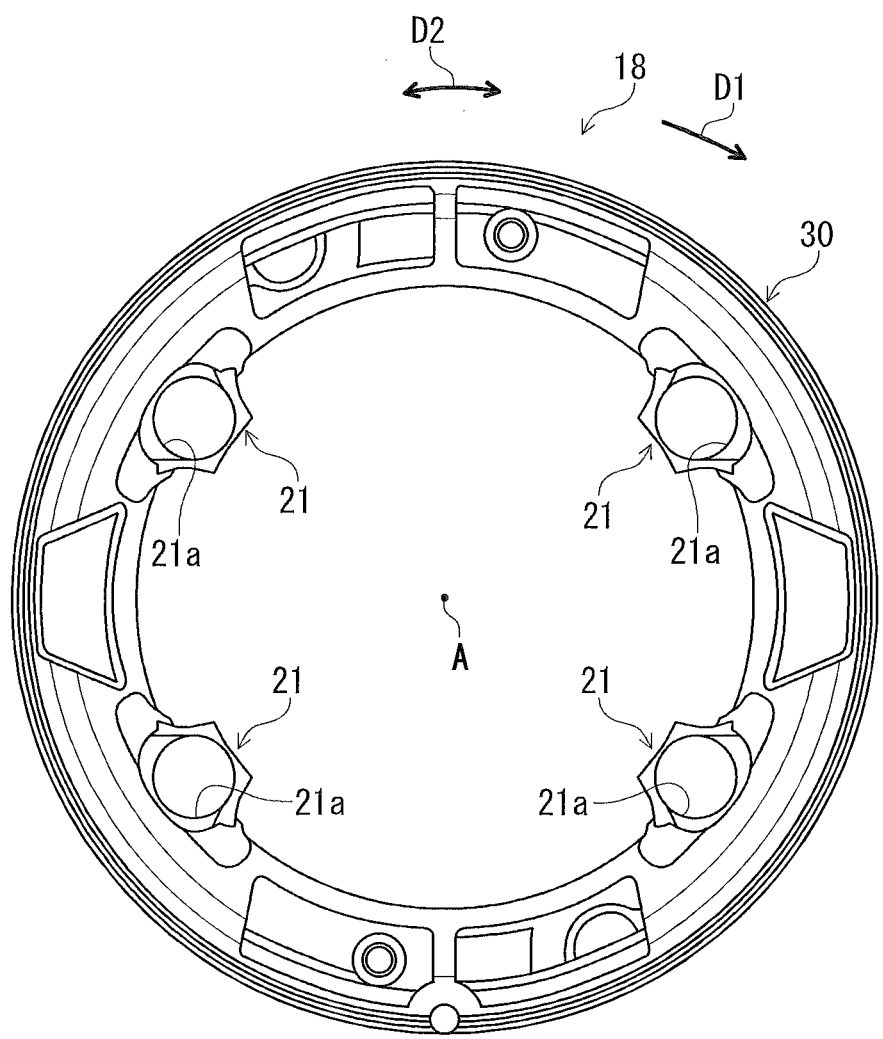
FIG. 10 is an outside elevational view of a base member of the bicycle sprocket illustrated in FIG. 1.
Figure 11:
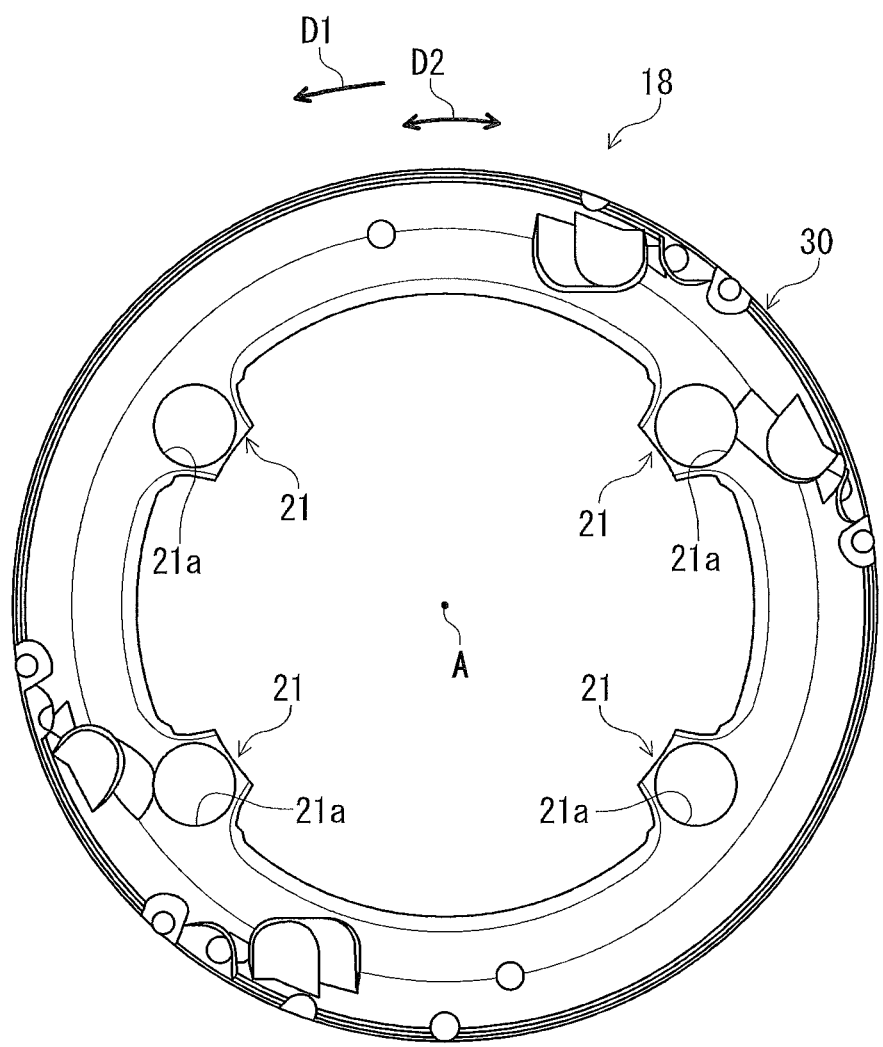
FIG. 11 is an inside elevational view of the base member of the bicycle sprocket illustrated in FIG. 1.

As illustrated in FIGS. 10 and 11, the base member 18 includes a main portion 30 having an annular shape. As illustrated in FIGS. 6 and 9, the annular base portion 24 of the sprocket member 16 is embedded in the main portion 30. As illustrated in FIGS. 10 and 11, the crank attachment portions 21 to which the crank arm 14 (FIG. 1) is to be attached are provided on an inner periphery of the main portion 30. As illustrated in FIG. 1, in the illustrated embodiment, the crank arm 14 is attached to the crank attachment portions 21 via the sprocket mounting member 12. As illustrated in FIGS. 10 and 11, the crank attachment portions 21 are spaced apart from each other in the circumferential direction D2. Each of the crank attachment portions 21 includes a fastener hole 21a to which the sprocket mounting member 12 is to be fastened. As illustrated in FIG. 9, the crank attachment portions 21 are embedded in the main portion 30 by the insert molding as well as the sprocket member 16.

Figure 12:
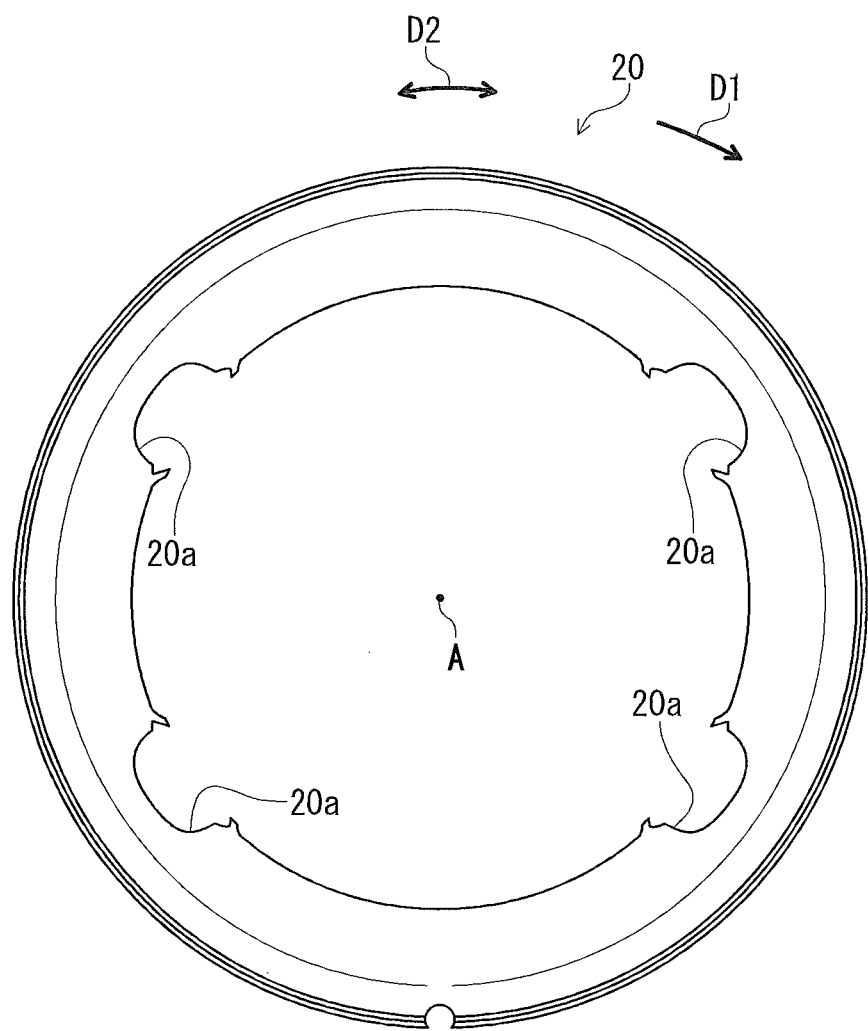
FIG. 12 is an outside elevational view of a cover member of the bicycle sprocket illustrated in FIG. 1.

As illustrated in FIG. 12, the cover member 20 has an annular shape and includes recesses 20a. The recesses 20a are provided on an inner periphery of the cover member 20 and are spaced apart from each other in the circumferential direction D2. The recesses 20a are provided at positions corresponding to the crank attachment portions 21 of the base member 18, respectively.

Figure 13:
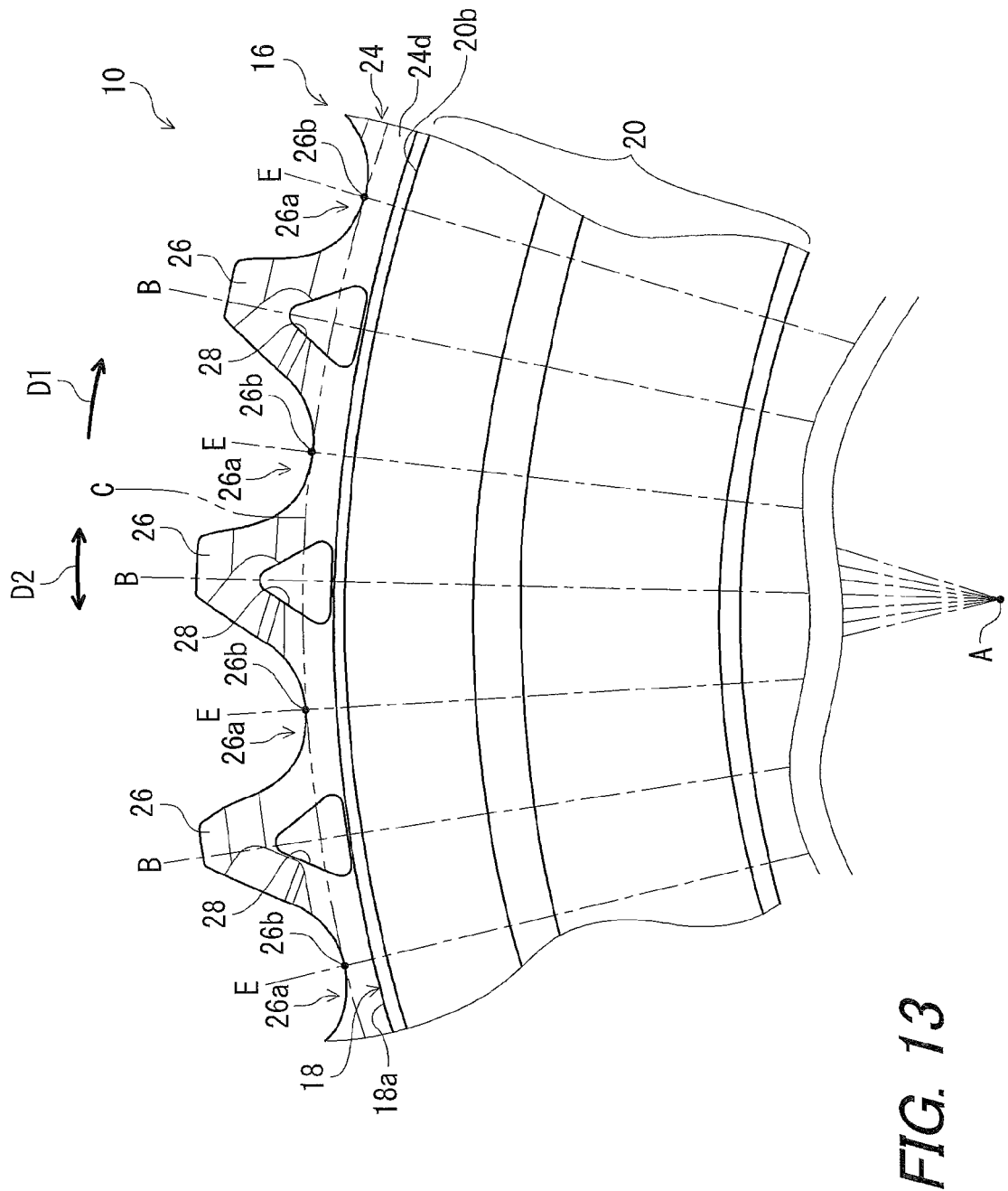
FIG. 13 is an enlarged outside elevational view of a part of the bicycle sprocket illustrated in FIG. 1.

Referring to FIG. 13, each of the sprocket teeth 26 has a tooth bottom 26a defining a root circle C of the sprocket teeth 26. Each of the tooth bottoms 26a is provided between adjacent two sprocket teeth 26 among the sprocket teeth 26 and has a reference point 26b. Each of the reference points 26b is closest to the rotational center axis A of the bicycle sprocket 10 in each of the tooth bottoms 26a. In the illustrated embodiment, each of the tooth bottoms 26a is provided on a radially outer peripheral edge of the annular base portion 24. Namely, the root circle C is defined on the radially outer peripheral edge of the annular base portion 24. The sprocket teeth 26 protrude radially outwardly from the radially outer peripheral edge of the annular base portion 24 (i.e., from the root circle C).

As illustrated in FIG. 13, each of the closed tooth openings 28 is partly positioned radially outwardly from the root circle C. In other words, a part of each of the closed tooth openings 28 is provided within each of the sprocket teeth 26. The remaining part of each of the closed tooth openings 28 is provided within the annular base portion 24. More specifically, the remaining part of each of the closed tooth openings 28 is provided within the second annular section 24d of the annular base portion 24. The root circle C is disposed on the closed tooth openings 28 when viewed from an axial direction parallel to the rotational center axis A. However, it will be apparent to those skilled in the bicycle field from the present disclosure that the closed tooth openings 28 can be at least partly positioned radially outwardly from the root circle C. For example, the entirety of at least one of the closed tooth openings 28 can be positioned radially outwardly from the root circle C.

As illustrated in FIG. 13, the closed tooth openings 28 are at least partly positioned radially outwardly from a radially outer peripheral edge 20b of the cover member 20. More specifically, each of the closed tooth openings 28 is positioned radially outwardly from the radially outer peripheral edge 20b of the cover member 20. However, it will be apparent to those skilled in the bicycle field from the present disclosure that a part of at least one of the closed tooth openings 28 can overlap with the cover member 20 when viewed from the axial direction.

As illustrated in FIG. 13, each of the closed tooth openings 28 is positioned radially outwardly from a radially outer peripheral edge 18a of the base member 18. However, it will be apparent to those skilled in the bicycle field from the present disclosure that the closed tooth openings 28 can be at least partly positioned radially outwardly from the radially outer peripheral edge 18a of the base member 18. For example, a part of at least one of the closed tooth openings 28 can overlap with the base member 18 when viewed from the axial direction. In the illustrated embodiment, the radially outer peripheral edge 18a of the base member 18 is positioned radially outwardly from the radially outer peripheral edge 20b of the cover member 20.

As illustrated in FIG. 13, each of the closed tooth openings 28 has a substantially triangular shape having three round apexes. Each of the closed tooth openings 28 is provided at a substantially middle position with respect to each of the sprocket teeth 26 in the circumferential direction D2. Each of the closed tooth openings 28 is symmetrical with respect to a tooth centerline B radially extending from the rotational center axis A of the bicycle sprocket 10. Each of the tooth centerlines B can be defined based on each of tooth bottom centerlines E, for example. Each of the tooth bottom centerlines E passes through the rotational center axis A and the reference point 26b of each of the tooth bottoms 26a. Each of the tooth centerlines B is disposed at a circumferential center position between adjacent two tooth bottom centerlines E of the tooth bottom centerlines E. It will be apparent to those skilled in the bicycle field from the present disclosure that the closed tooth openings 28 can have shapes other than the illustrated shape, such as a circle, an oval, a semicircle, a square, a polygon, and so on.

As described above, the closed tooth openings 28 can reduce the weight of the bicycle sprocket 10. Since the closed tooth openings 28 are at least partly positioned radially outwardly from the root circle C, the areas of the closed tooth openings 28 can be broaden, improving the weight saving of the bicycle sprocket 10. It will be apparent to those skilled in the bicycle field from the present disclosure that at least one closed tooth opening 28 which is at least partly positioned radially outwardly from the root circle C can improve the weight saving of the bicycle sprocket 10.

Second Embodiment

Figure 14:
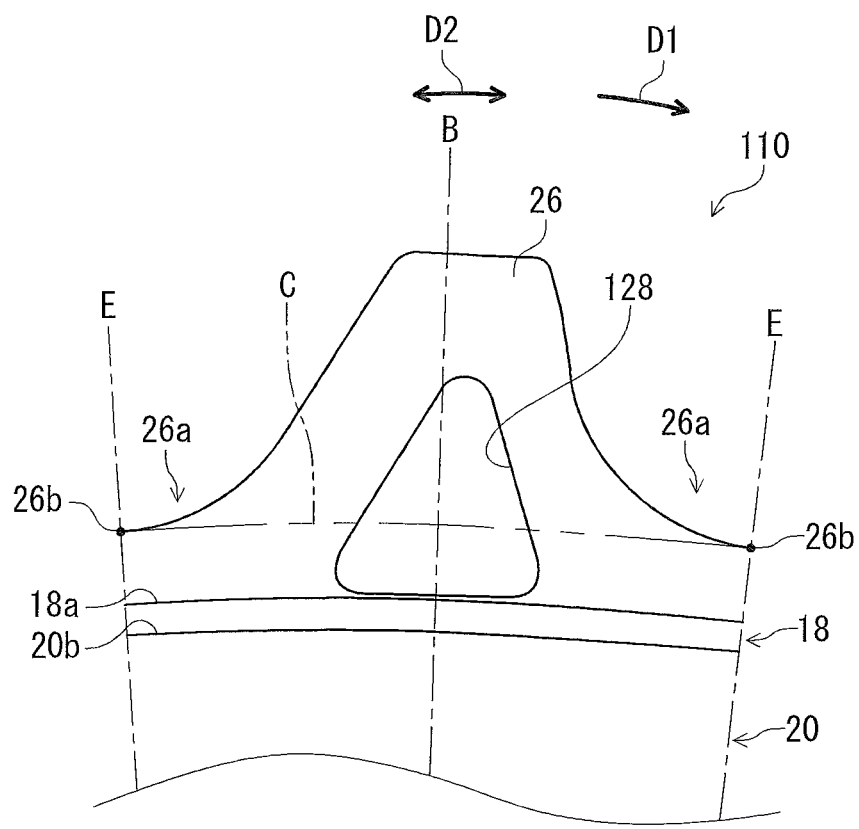
FIG. 14 is an enlarged outside elevational view of a part of a bicycle sprocket in accordance with a second embodiment.

A bicycle sprocket 110 in accordance with the second embodiment will be described below referring to FIG. 14. Elements having substantially the same function as those in the first embodiment will be numbered the same here, and will not be described again in detail.

In the first embodiment, each of the closed tooth openings 28 is symmetrical with respect to the tooth centerline B. As illustrated in FIG. 14, however, each of closed tooth openings 128 can be asymmetrical with respect to the tooth centerline B. Each of the closed tooth openings 128 has a substantially triangular shape having round apexes.

Third Embodiment

A bicycle sprocket 210 in accordance with the third embodiment will be described below referring to FIGS. 15 an 16. Elements having substantially the same function as those in the above embodiments will be numbered the same here, and will not be described again in detail.

Figure 15:
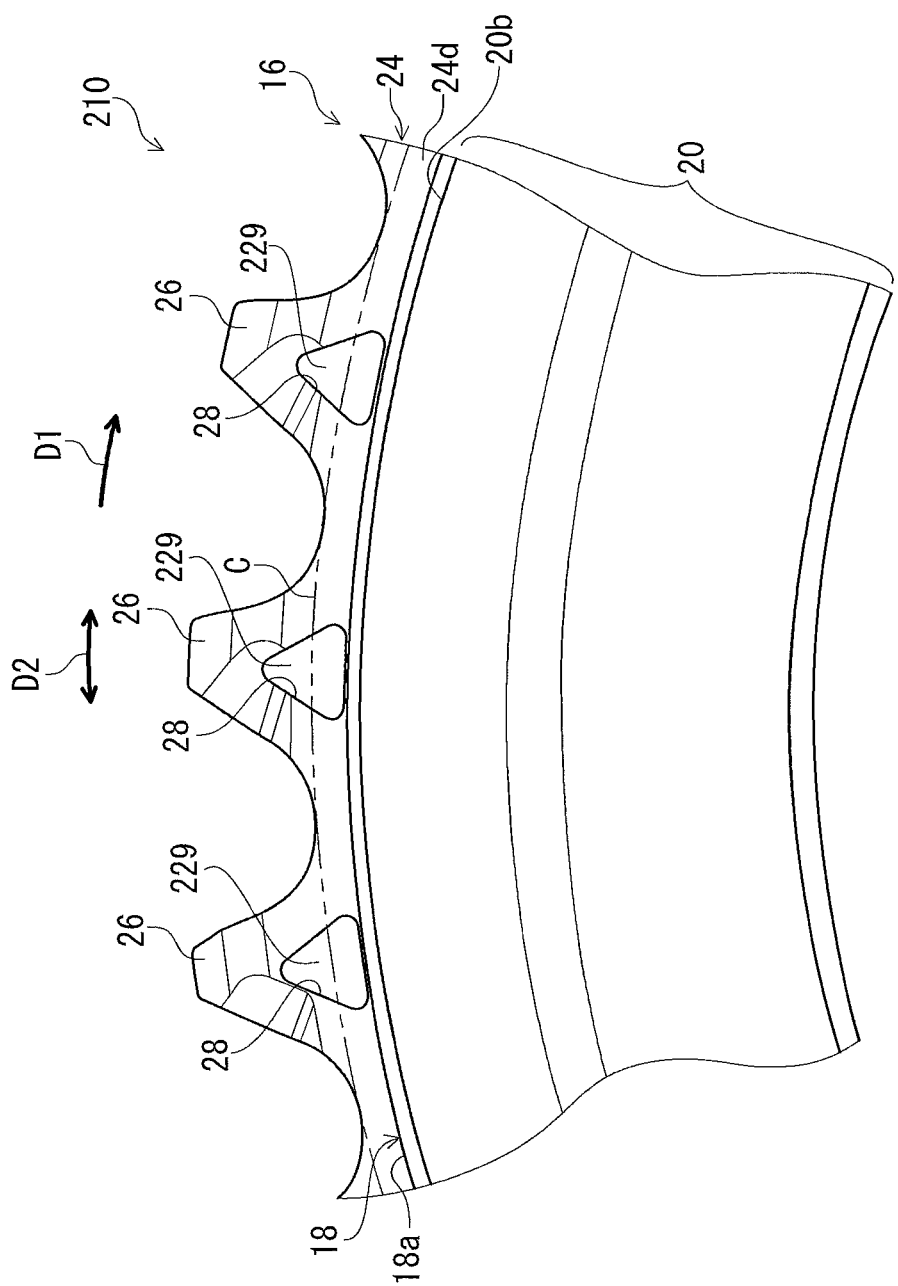
FIG. 15 is an enlarged outside elevational view of a part of a bicycle sprocket in accordance with a third embodiment.
Figure 16:
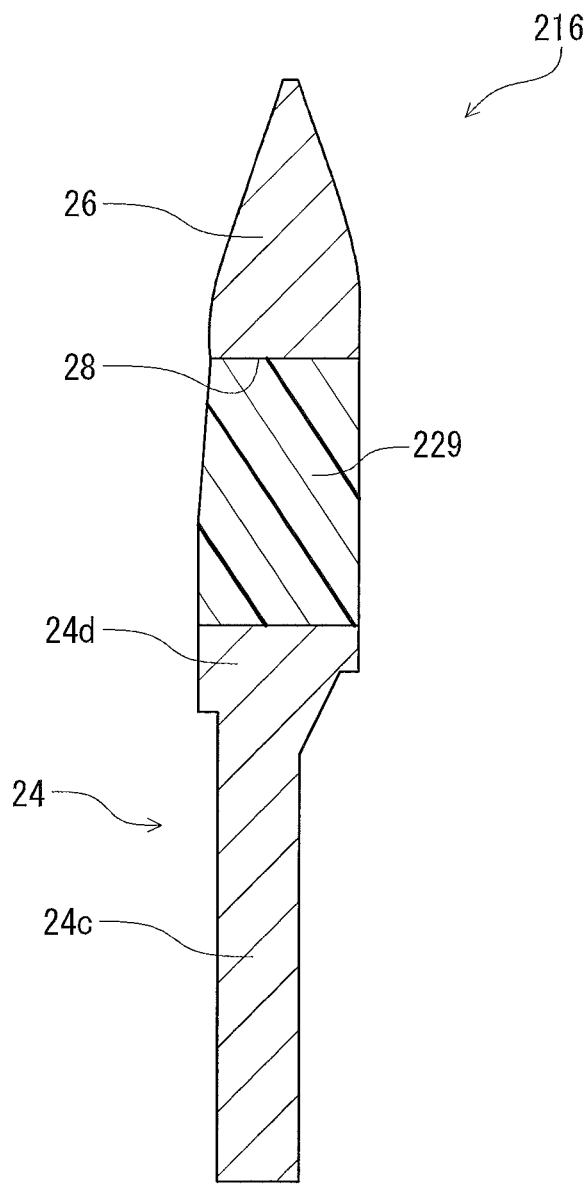
FIG. 16 is a cross-sectional view of a sprocket member of the bicycle sprocket illustrated in FIG. 15.

As illustrated in FIGS. 15 and 16, the bicycle sprocket 210 further comprises non-metallic members 229. The non-metallic members 229 are configured to be disposed in the closed tooth openings 28, respectively. The non-metallic members 229 are made of non-metallic material. For example, the non-metallic members 229 include resin material. The non-metallic members 229 are secured to the sprocket member 16 by adhesive, for example. The non-metallic members 229 made of resin material can reduce the vibration of the bicycle sprocket 10, reducing the undesirable noise caused by the sprocket member 16 and the bicycle chain.

It will be apparent to those skilled in the bicycle field from the present disclosure that the non-metallic members 229 can be made of non-metallic material other than resin material. The non-metallic members 229 can be made of polytetrafluoroethylene. The non-metallic members 229 made of polytetrafluoroethylene can improve the lubricating ability between the sprocket member 16 and the bicycle chain, reducing wear of the bicycle sprocket 210 and/or the bicycle chain. Furthermore, the non-metallic members 229 can include liquid lubricant to improve the lubricating ability between the sprocket member 16 and the bicycle chain. Also, the non-metallic members 229 can include solid lubricant to improve the lubricating ability between the sprocket member 16 and the bicycle chain Fourth Embodiment A bicycle sprocket 310 in accordance with the fourth embodiment will be described below referring to FIGS. 17 and 18. Elements having substantially the same function as those in the above embodiments will be numbered the same here, and will not be described again in detail.

Figure 17:
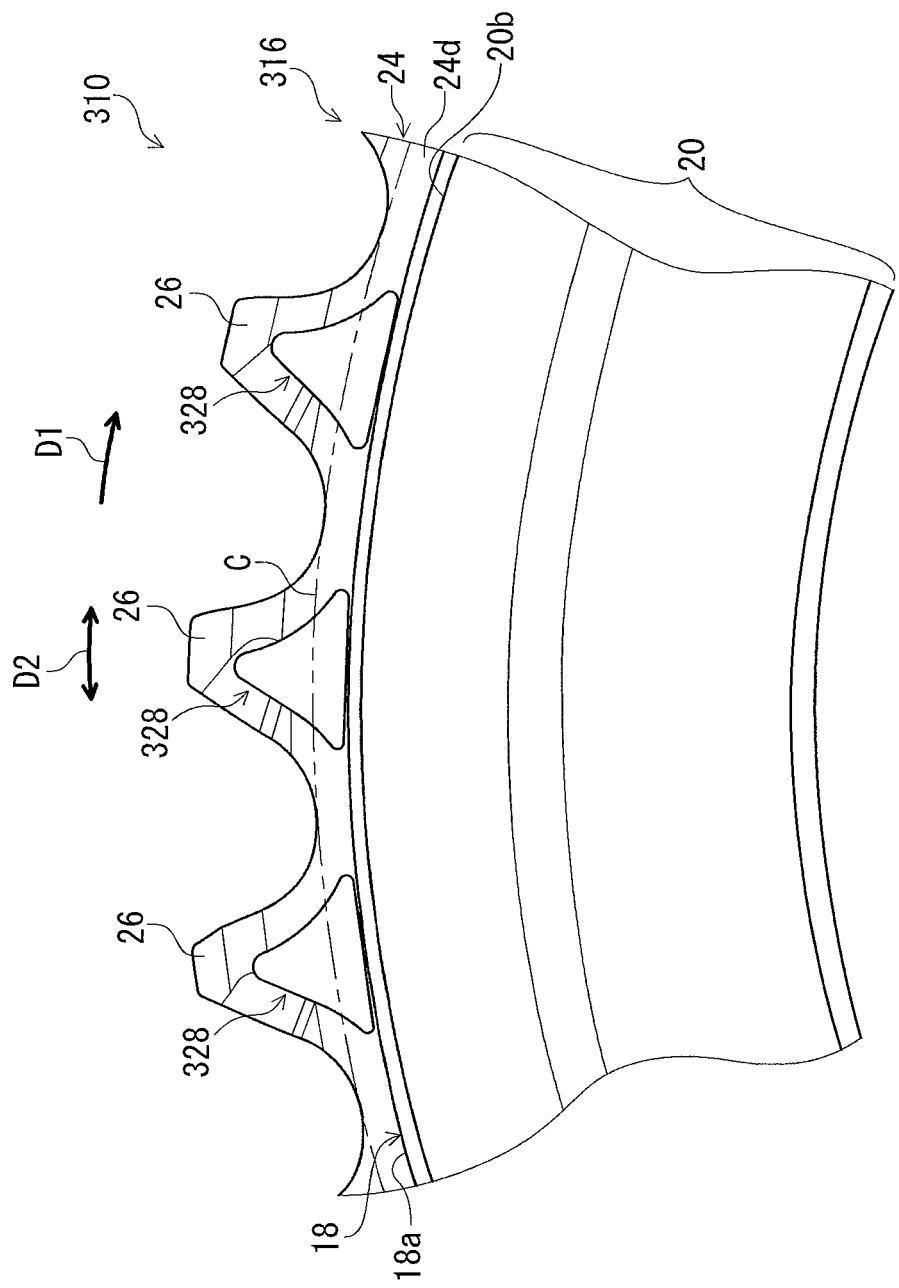
FIG. 17 is an outside elevational view of a part of a bicycle sprocket in accordance with a fourth embodiment.

As illustrated in FIG. 17, the bicycle sprocket 310 comprises a sprocket member 316. The sprocket member 316 includes the sprocket teeth 26 and closed tooth openings 328. Preferably, each of the closed tooth openings 328 is at least partly positioned radially outwardly from the root circle C.

Figure 18:
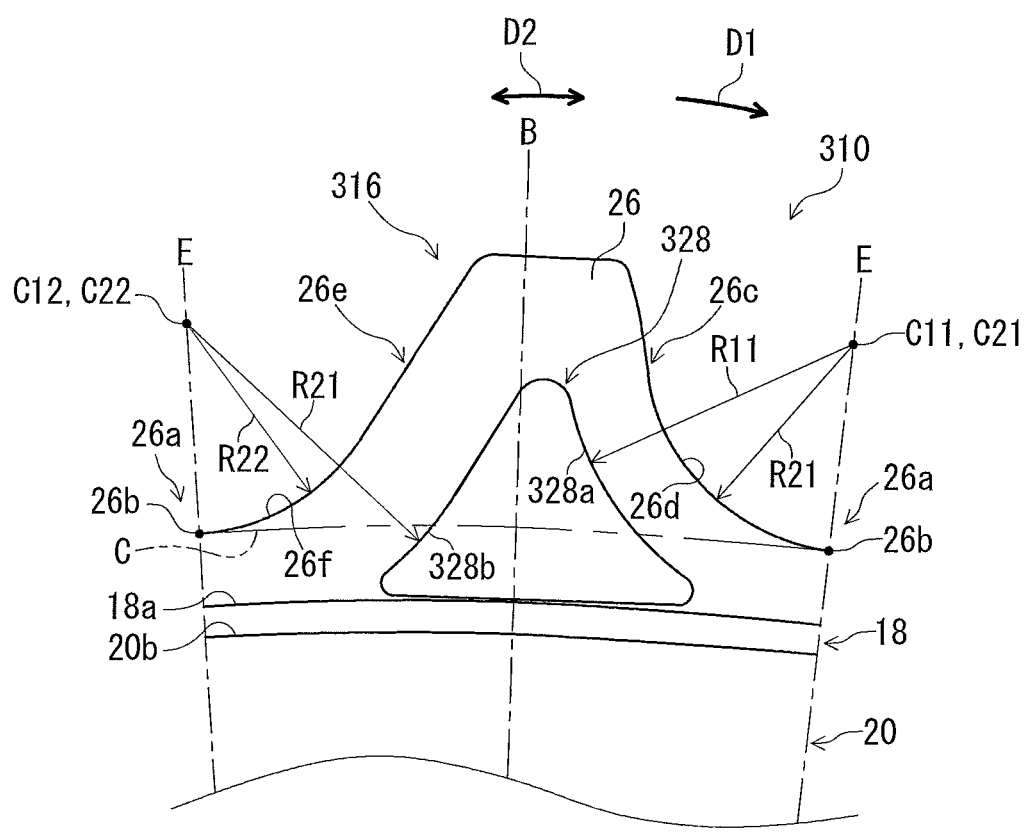
FIG. 18 is an enlarged outside elevational view of a part of the bicycle sprocket illustrated in FIG. 17.

As illustrated in FIG. 18, each of the closed tooth openings 328 includes a first curved inner edge 328a. Each of the sprocket teeth 26 includes a first outer edge 26c and a second outer edge 26e opposite to the first outer edge 26c with respect to the closed tooth opening 328 in the circumferential direction D2. The first outer edge 26c has a first curved outer edge 26d. The first curved outer edge 26d extends until the tooth bottom 26a. The reference point 26b is disposed on the first curved outer edge 26d. The first curved inner edge 328a is provided to at least partly extend along the first curved outer edge 26d when viewed from an axial direction parallel to the rotational center axis A of the bicycle sprocket 310. In the illustrated embodiments, the term "to at least partly extend along", as used herein, means that the first curved inner edge 328a extends at a substantially uniform distance from the first curved outer edge 26d for a predetermined length so that undesirable stress concentration resulting from pedaling force is reduced between the first curved inner edge 328a and the first curved outer edge 26d. Accordingly, necessary rigidity of the sprocket tooth 26 can be effectively obtained.

As seen in FIG. 18, a center C11 of curvature of the first curved inner edge 328a is disposed at a same position as a center C21 of curvature of the first curved outer edge 26d when viewed from the axial direction. In the illustrated embodiment, the centers C11 and C21 are disposed on the tooth bottom centerline E when viewed from the axial direction. A radius R11 of curvature of the first curved inner edge 328a is larger than a radius R21 of curvature of the first curved outer edge 26d.

As illustrated in FIG. 18, the closed tooth opening 328 includes a second curved inner edge 328b. The second outer edge 26e has a second curved outer edge 26f. The second curved outer edge 26f extends until the tooth bottom 26a. The reference point 26b is disposed on the second curved outer edge 26f. The second curved inner edge 328b is provided to at least partly extend along the second curved outer edge 26f when viewed from the axial direction. In the illustrated embodiments, the teen "to at least partly extend along", as used herein, means that the second curved inner edge 328b extends at a substantially uniform distance from the second curved outer edge 26f for a predetermined length so that undesirable stress concentration resulting from pedaling force is reduced between the second curved inner edge 328b and the second curved outer edge 26f. Accordingly, necessary rigidity of the sprocket tooth 26 can be effectively obtained. A center C12 of curvature of the second curved inner edge 328b is disposed at a same position as a center C22 of curvature of the second curved outer edge 26f when viewed from the axial direction. In the illustrated embodiment, the centers C12 and C22 are disposed on the tooth bottom centerline E when viewed from the axial direction. A radius R21 of curvature of the second curved inner edge 328b is larger than a radius R22 of curvature of the second curved outer edge 26f.

As seen in FIG. 18, in the illustrated embodiment, the first curved outer edge 26d is disposed on a downstream side of the second curved outer edge 26f with respect to the closed tooth opening 328 in the rotational driving direction D1. However, it will be apparent to those skilled in the bicycle field from the present disclosure that the first curved outer edge 26d can be disposed on an upstream side of the second curved outer edge 26f with respect to the closed tooth opening 328 in the rotational driving direction D1. One of the first curved inner edge 328a and the second curved inner edge 328b can be omitted if needed and/or desired. Furthermore, at least one of the closed tooth openings 328 can include a curved inner edge such as the first curved inner edge 328a or the second curved inner edge 328b.

As seen in FIG. 18, in the illustrated embodiment, the center C11 of curvature of the first curved inner edge 328a is disposed at a same position as the center C21 of curvature of the first curved outer edge 26d when viewed from the axial direction. However, the positions of the centers C11 and C21 are not limited to the illustrated position. For example, the center C11 of curvature of the first curved inner edge 328a can be disposed at a different position from the center C21 of curvature of the first curved outer edge 26d when viewed from the axial direction. Namely, the center C11 of curvature of the first curved inner edge 328a can be disposed at a substantially same position as the center C21 of curvature of the first curved outer edge 26d when viewed from the axial direction. Furthermore, the center C11 of curvature of the first curved inner edge 328a can be offset from the tooth bottom centerline E when viewed from the axial direction. The center C21 of curvature of the first curved outer edge 26d can be offset from the tooth bottom centerline E when viewed from the axial direction.

As seen in FIG. 18, in the illustrated embodiment, the center C12 of curvature of the second curved inner edge 328b is disposed at a same position as the center C22 of curvature of the second curved outer edge 26f when viewed from the axial direction. However, the positions of the centers C12 and C22 are not limited to the illustrated position. For example, the center C12 of curvature of the second curved inner edge 328b can be disposed at a different position from the center C22 of curvature of the second curved outer edge 26f when viewed from the axial direction. Namely, the center C12 of curvature of the second curved inner edge 328b can be disposed at a substantially same position as the center C22 of curvature of the second curved outer edge 26f when viewed from the axial direction. Furthermore, the center C12 of curvature of the second curved inner edge 328b can be offset from the tooth bottom centerline E when viewed from the axial direction. The center C22 of curvature of the second curved outer edge 26f can be offset from the tooth bottom centerline E when viewed from the axial direction. In the illustrated embodiment, such necessary rigidity of the sprocket tooth 26 can be effectively obtained irrespective of whether or not the closed tooth openings 328 are at least partly positioned radially outwardly from the root circle C.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein. For example, the closed tooth openings described in the above embodiments can be applied to a bicycle rear sprocket as well as the bicycle front sprocket.

What is claimed is:

1. A bicycle sprocket having a rotational center axis, the bicycle sprocket comprising:
    a sprocket member including:
        an annular base portion;
        sprocket teeth configured to protrude radially outwardly from the annular base portion, the sprocket teeth being arranged in a circumferential direction of the annular base portion, each of the sprocket teeth having a tooth bottom defining a root circle of the sprocket teeth; and
        a closed tooth opening being at least partly positioned radially outwardly from the root circle, the closed tooth opening is free of a metallic material when the bicycle sprocket is in an assembled state.

2. The bicycle sprocket according to claim 1, wherein
    the sprocket member includes a plurality of closed tooth openings, and
    each of the closed tooth openings is at least partly positioned radially outwardly from the root circle.

3. The bicycle sprocket according to claim 2, wherein
    a total number of the closed tooth openings is equal to a total number of the sprocket teeth.

4. The bicycle sprocket according to claim 1, wherein the sprocket member is made of metallic material.

5. The bicycle sprocket according to claim 1, further comprising:
    a base member made of non-metallic material, wherein the annular base portion of the sprocket member is configured to be attached to the base member.

6. The bicycle sprocket according to claim 5, wherein
    the closed tooth opening is at least partly positioned radially outwardly from a radially outer peripheral edge of the base member.

7. The bicycle sprocket according to claim 5, further comprising:
    a crank attachment portion to which a crank arm is to be attached, wherein
    the crank attachment portion is configured to be attached to the base member.

8. The bicycle sprocket according to claim 5, further comprising:
    a cover member configured to be attached to the base member.

9. The bicycle sprocket according to claim 8, wherein
    the closed tooth opening is at least partly positioned radially outwardly from a radially outer peripheral edge of the cover member.

10. The bicycle sprocket according to claim 5, wherein
    the annular base portion includes a first through-hole, and
    at least part of the annular base portion is embedded in the base member such that a part of the base member is provided in the first through-hole.

11. The bicycle sprocket according to claim 10, wherein
    the first through-hole is provided radially inward of the closed tooth opening.

12. The bicycle sprocket according to claim 11, further comprising:
    a pin member attached to the sprocket member, wherein
    the annular base portion of the sprocket member includes a second through-hole, and
    the pin member is attached to the sprocket member through the second through-hole.

13. The bicycle sprocket according to claim 11, wherein
    the second through-hole is provided radially inward from the closed tooth opening.

14. The bicycle sprocket according to claim 1, wherein
    the tooth bottom is provided on a radially outer peripheral edge of the annular base portion, and
    the root circle is defined on the radially outer peripheral edge of the annular base portion.

15. The bicycle sprocket according to claim 1, wherein
    the closed tooth opening is symmetrical with respect to a tooth centerline radially extending from the rotational center axis of the bicycle sprocket.

16. The bicycle sprocket according to claim 1, wherein
    the closed tooth opening is asymmetrical with respect to a tooth centerline radially extending from the rotational center axis of the bicycle sprocket.

17. A bicycle sprocket having a rotational center axis, the bicycle sprocket comprising:
    a sprocket member including:
        an annular base portion;
        sprocket teeth configured to protrude radially outwardly from the annular base portion, the sprocket teeth being arranged in a circumferential direction of the annular base portion, each of the sprocket teeth having a tooth bottom defining a root circle of the sprocket teeth: and
        a closed tooth opening being at least partly positioned radially outwardly from the root circle; and
    a non-metallic member configured to be disposed in the closed tooth opening.

18. The bicycle sprocket according to claim 17, wherein the non-metallic member includes resin material.

19. The bicycle sprocket according to claim 17, wherein the non-metallic member is made of polytetrafluoroethylene.

20. The bicycle sprocket according to claim 17, wherein the non-metallic member includes liquid lubricant.

21. The bicycle sprocket according to claim 17, wherein the non-metallic member includes solid lubricant.

22. A bicycle sprocket having a rotational center axis, the bicycle sprocket comprising:
a sprocket member including:
an annular base portion;
sprocket teeth configured to protrude radially outwardly from the annular base portion, the sprocket teeth being arranged in a circumferential direction of the annular base portion; and
a closed tooth opening including a first curved inner edge, one of the sprocket teeth including a first outer edge and a second outer edge opposite to the first outer edge with respect to the closed tooth opening in the circumferential direction, the first outer edge having a first curved outer edge, the first curved inner edge being provided to at least partly extend along the first curved outer edge when viewed from an axial direction parallel to the rotational center axis.

23. The bicycle sprocket according to claim 22, wherein a center of curvature of the first curved inner edge is disposed at a same position as a center of curvature of the first curved outer edge when viewed from the axial direction.

24. The bicycle sprocket according to claim 22, wherein the second outer edge has a second curved outer edge, the closed tooth opening includes a second curved inner edge, and
the second curved inner edge is provided to at least partly extend along the second curved outer edge when viewed from the axial direction.

25. The bicycle sprocket according to claim 24, wherein a center of curvature of the second curved inner edge is disposed at a same position as a center of curvature of the second curved outer edge when viewed from the axial direction.

26. The bicycle sprocket according to claim 22, wherein each of the sprocket teeth has a tooth bottom defining a root circle of the sprocket teeth, and
the closed tooth opening is at least partly positioned radially outwardly from the root circle.

27. The bicycle sprocket according to claim 22, wherein the closed tooth opening is free of a metallic material when the bicycle sprocket is in an assembled state.

28. A bicycle sprocket having a rotational center axis, the bicycle sprocket comprising:
a sprocket member including:
an annular base portion;
sprocket teeth configured to protrude radially outwardly from the annular base portion, the sprocket teeth being arranged in a circumferential direction of the annular base portion, each of the sprocket teeth having a tooth bottom defining a root circle of the sprocket teeth; and
a closed tooth opening being partly positioned radially outwardly from the root circle and partly positioned radially inward from the root circle.

29. A bicycle sprocket having a rotational center axis, the bicycle sprocket comprising:
a sprocket member including:
an annular base portion;
sprocket teeth configured to protrude radially outwardly from the annular base portion, the sprocket teeth being arranged in a circumferential direction of the annular base portion, each of the sprocket teeth having a tooth bottom defining a root circle of the sprocket teeth; and
a closed tooth opening including a first curved inner edge, one of the sprocket teeth including a first outer edge and a second outer edge opposite to the first outer edge with respect to the closed tooth opening in the circumferential direction, the first outer edge having a first curved outer edge, the first curved inner edge being provided to at least partly extend along the first curved outer edge when viewed from an axial direction parallel to the rotational center axis,
wherein the tooth opening is partly positioned radially outwardly from the root circle.

30. The bicycle sprocket according to claim 29, wherein the closed tooth opening is partly positioned radially inward from the root circle.

* * * * *